United States Patent
Engstrom (10) Patent No.: US 9,413,888 B2
(45) Date of Patent: Aug. 9, 2016

(54) TERMINAL BASED INTERACTIVE VOICE RESPONSE SYSTEM WITH INFORMATION PRIORITIZATION

(71) Applicant: Nickelback OU, Tallinn (EE)

(72) Inventor: Timo Esko Engstrom, Tallinn (EE)

(73) Assignee: Nickelback OU, Tallinn (EE)

( * ) Notice: Subject to any disclaimer, the term of this patent is extended or adjusted under 35 U.S.C. 154(b) by 0 days.

(21) Appl. No.: 14/887,457

(22) Filed: Oct. 20, 2015

(65) Prior Publication Data

US 2016/0044169 A1    Feb. 11, 2016

Related U.S. Application Data

(63) Continuation-in-part of application No. 14/126,018, filed as application No. PCT/IB2012/001163 on Jun. 15, 2012, now abandoned.

(30) Foreign Application Priority Data

Jun. 15, 2011   (EE) .................................. 201100045

(51) Int. Cl.
*H04W 4/12*    (2009.01)
*H04M 3/493*   (2006.01)
*H04M 7/00*    (2006.01)
*H04M 3/533*   (2006.01)

(52) U.S. Cl.
CPC .......... *H04M 3/4936* (2013.01); *H04M 3/5335* (2013.01); *H04M 7/0021* (2013.01); *H04W 4/12* (2013.01)

(58) Field of Classification Search
CPC ............ H04M 1/642; H04M 3/42059; H04M 3/4365; H04M 3/493; H04M 3/5335; H04M 2201/38; H04M 2203/2005; H04M 2203/355; H04M 2242/40; H04M 3/533; H04M 15/842; H04M 15/844; H04M 17/205; H04M 3/567; H04M 2215/8137; H04M 15/8072; H04M 3/4936; H04M 7/0021; H04M 7/00; H04M 3/4931; H04M 15/76; H04M 3/4933; H04M 3/4938; H04W 4/12; H04W 4/08; H04W 56/00; H04W 56/002; H04W 56/0015

See application file for complete search history.

(56) References Cited

U.S. PATENT DOCUMENTS

| | | | | |
|---|---|---|---|---|
| 7,068,643 | B1 * | 6/2006 | Hammond | H04M 3/493 370/352 |
| 7,881,285 | B1 * | 2/2011 | Hammond | H04M 3/493 370/352 |
| 7,908,381 | B2 * | 3/2011 | Koch | H04M 7/0027 709/227 |
| 8,009,811 | B2 * | 8/2011 | Sharma | H04M 3/242 379/88.04 |
| 8,437,453 | B2 * | 5/2013 | Ohanlon | H04M 3/493 379/76 |
| 8,548,135 | B1 * | 10/2013 | Lavian | H04M 3/493 379/93.25 |
| 9,001,819 | B1 * | 4/2015 | Or-Bach | H04L 65/4015 370/352 |
| 2003/0197615 | A1 * | 10/2003 | Roche | G08B 21/22 340/573.1 |
| 2004/0120479 | A1 * | 6/2004 | Creamer | H04M 3/493 379/88.22 |
| 2004/0121814 | A1 * | 6/2004 | Creamer | H04M 1/72583 455/563 |

(Continued)

*Primary Examiner* — Meless Zewdu
(74) *Attorney, Agent, or Firm* — Berggren Inc.

(57) ABSTRACT

A terminal based interactive IVR system with information prioritization is disclosed. The IVR functionality is served by the main user's terminal device, which allows a user of the IVR system to create personal action tree for each individual caller or also caller group, where the action tree can be created and maintained via the main user's terminal device itself and also via a remote configuration, storage and synchronization facility in the data communication network. Also a caller is allowed to enter the priority information to the transferable message (for example a voice or text message).

14 Claims, 6 Drawing Sheets

(56) References Cited

U.S. PATENT DOCUMENTS

| | | | | |
|---|---|---|---|---|
| 2004/0122941 A1* | 6/2004 | Creamer | H04M 3/42059 | 709/224 |
| 2007/0263834 A1* | 11/2007 | Jensen | H04M 3/24 | 379/235 |
| 2008/0075251 A1* | 3/2008 | Jefferson | H04M 15/00 | 379/142.07 |
| 2008/0226042 A1* | 9/2008 | Singh | H04M 1/247 | 379/88.04 |
| 2009/0154666 A1* | 6/2009 | Rios | G06F 3/04895 | 379/88.18 |
| 2009/0232283 A1* | 9/2009 | Zhang | H04M 3/523 | 379/80 |
| 2011/0158392 A1* | 6/2011 | DeLuca | H04M 3/493 | 379/88.18 |
| 2011/0211679 A1* | 9/2011 | Mezhibovsky | H04M 3/42382 | 379/88.18 |
| 2012/0140904 A1* | 6/2012 | Li | H04M 3/493 | 379/88.01 |

\* cited by examiner

TERMINAL BASED INTERACTIVE VOICE RESPONSE SYSTEM WITH INFORMATION PRIORITIZATION

PRIORITY

This is a continuation in part application of U.S. application Ser. No. 14/126,018 filed on Mar. 17, 2014 as a US national phase application of PCT/IB2012/001163 filed on Jun. 15, 2012 claiming priority of Estonian national application number P201100045 filed on Jun. 15, 2011, and issued as a patent number 05713B1 on Apr. 15, 2014, all of which are incorporated herein by reference.

FIELD OF THE INVENTION

This invention relates to terminal based interactive voice response (IVR) system, which refers to such a solution where the server functionality that handles the incoming calls runs inside a smart device, such as smartphone or tablet computer, which has the ability to allow the caller of the terminal based interactive IVR system to prioritize the transferable message (for example a voice or text) that will be transferred to the main users mobile terminal.

BACKGROUND

IVR systems are well known from the telephone networks, where the caller after reaching the IVR function in the server, is requested to use phone keys to respond to IVR's requested options, e.g. to press "1" in order to be connected to network terminal of a person "A" etc. Such a solution is used in the core of the telephone network, and in addition of being costly, it is very limited in different options the final destination number holder may request from the IVR. Also, in the server based IVR systems users have limited access to the functions of the system, and the system is configured and changed by the system administrator or owner.

Terminal based IVR systems are known (U.S. Pat. No. 7,881,285, published 1 Feb. 2011; JP2002204300, published 19 Jul. 2002), where the IVR accessing functionality is located on the caller's terminal device, which may also be a mobile terminal. In known solutions the incoming call is responded by the IVR functionality in a way which is preconfigured in the terminal device. It requires manual real time input during the call, there is no pre-constructed tree, let alone one that it could be tailored differently for each caller. It is common to have different responses based on the caller's identification number (ID) in the contact list of the terminal device, based on number belonging to a predefined group or alike. Also, it is known that IVR functionality can be divided into modules and sub-modules, and these modules can be downloaded by the terminal owner based on the required functionality.

A known terminal based interactive IVR system's solution is provided by the company Mobisophy Technologies (with a software based solution of "Interactive Voice Call Master for S60") which also allows creation and storage of some profiles with the IVR's responses to different callers based on e.g. caller groups.

A solution for enhancing processing priority, implementing interactive service and implementing customized IVR flow is known from patent application KR20100047150 (published 5 Jul. 2010), where the central system after receiving some prior information about the caller, is able to provide to a caller a customized IVR tree, and where the processing priority level can be changed.

A solution for automating IVR system interaction is known from patent application WO 2009/079252 (published 25 Jun. 2009) and US2009154666 A1 (published 18 Jun. 2009), where the caller's terminal device receives the menu tree of the IVR system from the server or remote database, and based on the visual menu tree the caller can interact with the IVR system in the server. The system also updates the menu tree on the caller's terminal device according to changes made in the IVR system's server. In the known solutions, the terminal based approach is limited by the properties of caller's terminal device and not by callee's terminal device.

A known solution is described in patent application US 2005/0216551 A1 (published 29 May 2005), which contains modular automated calling system, wherein the system itself initiates calls to other people (e.g. for making sales offers for goods and services). In addition in the system a limited preconfigured action tree is defined, where the common actions are described, depending on the callee's responses. The system plays back pre-recorded sound clips to the callee.

A known solution is described in the patent application EP0973314 (published 19 Jan. 2000), where the dynamic responding solution of the IVR-system is given, according to the solution the sequence of the responses presented to the caller is changed, e.g. based on the selections made by the same caller during predefined time period in the past or based on the selections made by all callers; the hierarchy of the options presented to the caller is adjusted in such a way, that the most frequent selections are provided to the caller earlier (e.g. during system startup the caller was provided options in the following sequence: "1", "2", "3" etc., then after analysing the selections made by the callers over the period of time, then later the caller is provided the options in the new sequence, e.g.: "3", "1", "4", "2" etc). The described solution is focused on finding optimal sequence of options to be presented to the particular caller or all callers, and not about creating a personal action tree for each caller.

Currently known terminal based interactive IVR solutions are not able to provide the full structure of the IVR system to be created and maintained both in the terminal and in the remote configuration, storage and/or synchronization facility located in a data communication network (e.g. Internet). Moreover, in the known systems the caller has been given only trivial control over the actions requested by the IVR and the caller is not able to prioritize the transferable (for example a voice or text) message.

SUMMARY OF THE INVENTION

This invention accordingly provides solutions lacking from the currently known terminal based interactive IVR systems.

It is an object of this invention to provide a terminal based interactive IVR system, which allows a main user of the system to create at least one personal action tree for each user individually (or globally using wildcards, where one tree would match all callers). The action tree can be created and maintained via the terminal device of the main user itself.

It is an object to provide an IVR system where remote configuration, storage and/or synchronization facility in the data communication network can be created and maintained by the terminal device of the main user.

It is a further object to provide an IVR system where there can be more than one action tree defined per each user.

It is an object to provide an IVR system where the user has a possibility to assign different priorities to the message (for example a voice or text message) about to be transferred and add other data.

It is an object of this invention to provide a terminal based interactive voice response (IVR) system with information prioritization, said system comprising: a terminal device of a main user comprising a memory unit, a display unit, an input unit, a sound unit and a communication unit, and terminal devices of one or more users, wherein: the IVR system is served from and maintained in the terminal device of the main user and adjusted to exchange information with the terminal devices of the user(s), and wherein inquiries and actions in the system are carried out according to one or more actions trees created and stored in the main user's terminal device, and the IVR system comprises means allowing the system maintained and served in the terminal device of the main user to interact with one or more user terminal devices and allowing user(s) to assign different values of priority level to a message before transmission of the message to the main user, thereby individually personalizing the action tree for the user(s), and wherein the system comprises a remote configuration, storage and synchronization facility on a data communication network and wherein the remote configuration, the storage and synchronization facility comprise a storage area and a network communication unit, and wherein the main user's terminal device is adjusted to exchange information with the remote configuration, the storage and the synchronization facility, and the action tree can be created, tested and maintained both through the main user's terminal device and through the remote configuration, storage and synchronization facility.

BRIEF DESCRIPTION OF THE FIGURES

FIG. 6 shows the generic connectivity diagram of the system. Interconnections between the terminal devices and the remote configuration, storage and synchronization facility on a data communication network with the selected information flow is shown in greater detail.

DETAILED DESCRIPTION OF THE INVENTION

The aim of the invention is to provide a terminal based interactive IVR system, which allows a main user of the IVR system to create at least one personal action tree for each user individually, where the action tree can be created and maintained via the terminal device of the main user itself. Also a remote configuration, storage and/or synchronization facility in the data communication network can be created and maintained by the terminal device of the main user. Also there can be more than one action tree defined per each user. In addition, the user has a possibility to assign different priorities to the message (for example a voice or text message) about to be transferred and add other data. Actions and requests in the terminal based interactive IVR system are carried out according to an action tree.

The remote configuration, storage and/or synchronization facility comprises storage area and network communication unit.

The terminal based interactive IVR system of this invention has one or more users and at least one main user defined. Interactive IVR system is functioning in the terminal device of the main user and is adjusted for information exchange with the terminal device of the user(s). In the telephone network users initiate phone calls (as being "callers") to the main user (being "callee"), while before creating a connection with the main user, the terminal device of the user exchanges information with the terminal based interactive IVR system in the main user's terminal device.

The terminal based interactive IVR system contains main user's terminal device, which is equipped with an input unit, such as a keypad, a display, a sound unit or a memory unit, where the IVR system is stored and operated. The main user's terminal device also contains at least one action tree and messages to be played to the caller. Also, the main user's terminal device is equipped with means for communication with the remote configuration, storage and/or synchronization facility, which is also equipped with means to store and create the IVR action tree with the response data. Therefore in the terminal based IVR system the IVR functionality is served by the terminal device of the main user. The communication between the main user's terminal device and the remote configuration, storage and/or synchronization facility can be optionally automated.

The terminal based interactive IVR system of this invention is equipped with a functionality of at least answering an incoming call, responding to the user, reading the keypad readings and also a functionality through which the user is enabled to interact freely with the IVR system, and in addition to common received call greeting, the user is enabled to assign additional prior information about the transferable message (for example a voice or text message), e.g. while the terminal based interactive IVR system has responded to the user on behalf of the main user, then the user can assign a priority level to the message he/she is about to leave, such that based on the provided priority information the terminal based interactive IVR system can be equipped with such a decision tree, that the message can be handled by different means and not only classified based on the value of the user's ID: for example, the user can make a choice, if the request to communicate with the main user is urgent, and then depending on that additional information the IVR can run different actions accordingly. For example, when the message has been set to have 'low priority' then the user is allowed to leave a voice mail, but when the message is set to have 'high priority', then the main user is also notified by predefined means, e.g. text message or any other predefined means. Also other information may be used by the action tree as well; for example time of the day or type of the user's terminal device may be included in the information, or combination of information with some main user's information may be entered into the IVR. As a result the same action tree for the same caller ID could have a different outcome.

Thus, the IVR system of this invention is equipped with the additional customized functionality and means. Moreover, additional criterias and conditions set by the main user are used for optionally affecting the behaviour of the action tree, specially in cases where more than one action tree exists per user. At the same time, the action tree with additional data entered by the main user, allows adding more information, used by the system for selecting the correct action tree, specially in cases where more than one action tree exists per user. Additionally, one or more code words are defined in the terminal based interactive IVR system of this invention, and such code words are known to the main user of the terminal based interactive IVR system, but not offered to the user(s) by the terminal based interactive IVR system itself. The code words which have main user definable meanings in the terminal based interactive IVR system, and also a part or the entire action tree can be hidden from to the user(s).

Among other tasks, the remote configuration, storage and/or synchronization facility in the data communication network allows creating, modifying, deleting, synchronizing, storing and restoring the action trees for the terminal based interactive IVR system, and exchanging them with the main user's terminal device via the communication unit. The creation of one or more action trees in the terminal based interactive IVR system of this invention can be handled by the main user per each user independently, while also allowing the main user of the terminal based interactive IVR system to create the action tree for several users in a single step.

The structure of the entire terminal based interactive IVR system of this invention is modular, by involving at least one module.

The user in the terminal based interactive IVR system of this invention can be understood to be as an individual person who is calling or a person who is belonging to a group of persons. Therefore, it is possible to have action trees covering user groups.

This disclosure provides a terminal based interactive voice response IVR system with information prioritization, comprising the IVR system on the terminal device of the main user with the functionality of at least answering the call, and input device (user's terminal device) for interacting with the main user, and a keypad (virtual or physical) for information insertions, means for information reading and functions; the main user's terminal device comprises at least a memory unit, a display unit, an input unit, a sound unit and a communication unit; the inquiries and actions in the system are carried out according to action trees; the system is characterized in that it comprises additional means allowing terminal based IVR system to interact with the user dynamically and allowing the user to assign different values of priority level to the transferable message (for example a voice or text message) prior transmission of the message; comprising at least one module and allowing the processing of inserted information by at least one module while the action tree is individually personalized and assigned to at least one user, and at the same time a user has at least one action tree assigned to and means in main user's terminal device allowing action tree or parts of it to be hidden and an additional data and criteria which is used for selecting the action tree if more than one exists per user can be applied by the main user, also each user can react to many action trees and apply a system level pass through code word which allows the user to be in contact with the main user automatically regardless of the active action tree; system also comprises customized functionality and means that allows it to be added to the system; comprises remote configuration, storage and synchronization facility on the data communication network, the remote configuration, storage and synchronization facility comprises storage area and network communication unit in such, that the terminal is adjusted to exchange information with the remote configuration, storage and synchronization facility; the action tree can be created and maintained both through the terminal device running the interactive IVR system and through the remote configuration, storage and synchronization.

DETAILED DESCRIPTION OF THE PREFERRED EMBODIMENTS

Below the detailed description of the preferred embodiments is given. Reference is made to FIGS. 1-6.

Figure 6:
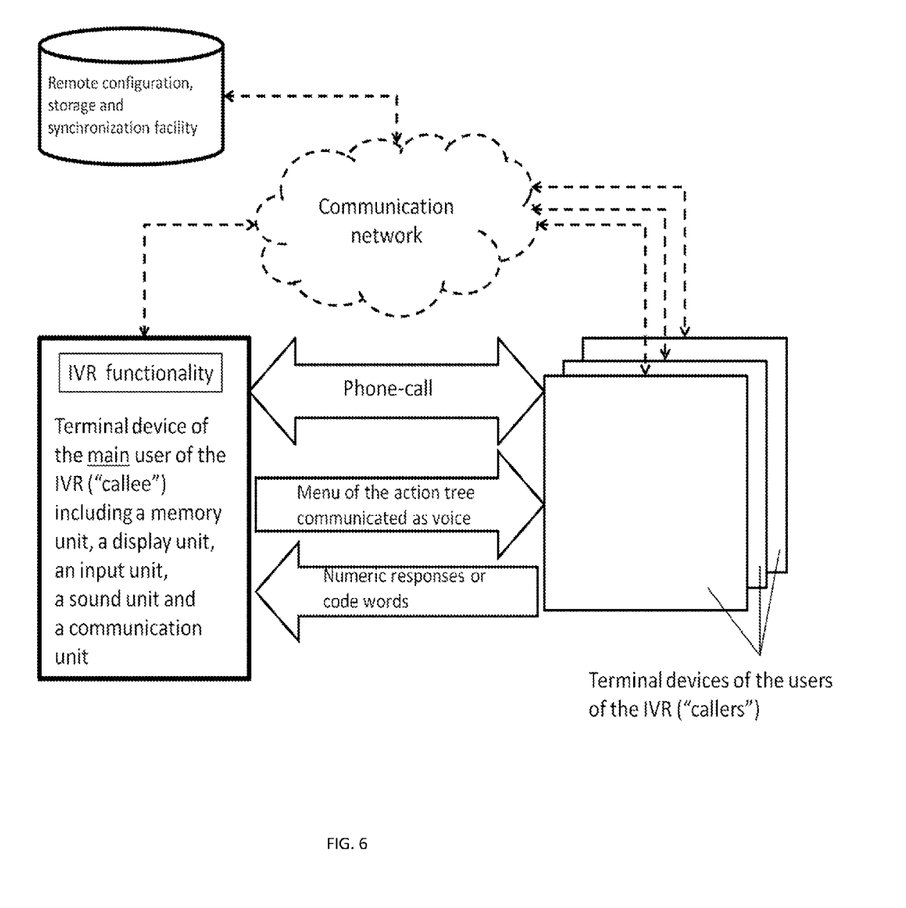

The terminal based interactive IVR system of this inventions comprises a main user terminal device (see FIG. 6), which is equipped with an input unit such as a keypad, a display, a sound unit or a memory unit, where the terminal based interactive IVR system functionality and its submodules, with at least one action tree and the messages to be played to the user, are stored in and served from. Also, the main user's terminal device is equipped with means for communicating with a remote configuration, a storage and/or a synchronization facility (FIG. 6), which in turn is also equipped with means to create, modify, delete, synchronize, store and restore the terminal based interactive IVR system's action trees with response data. The main user's terminal device is equipped with means to communicate with the user(s) through their terminal devices (FIG. 6).

Figure 1:
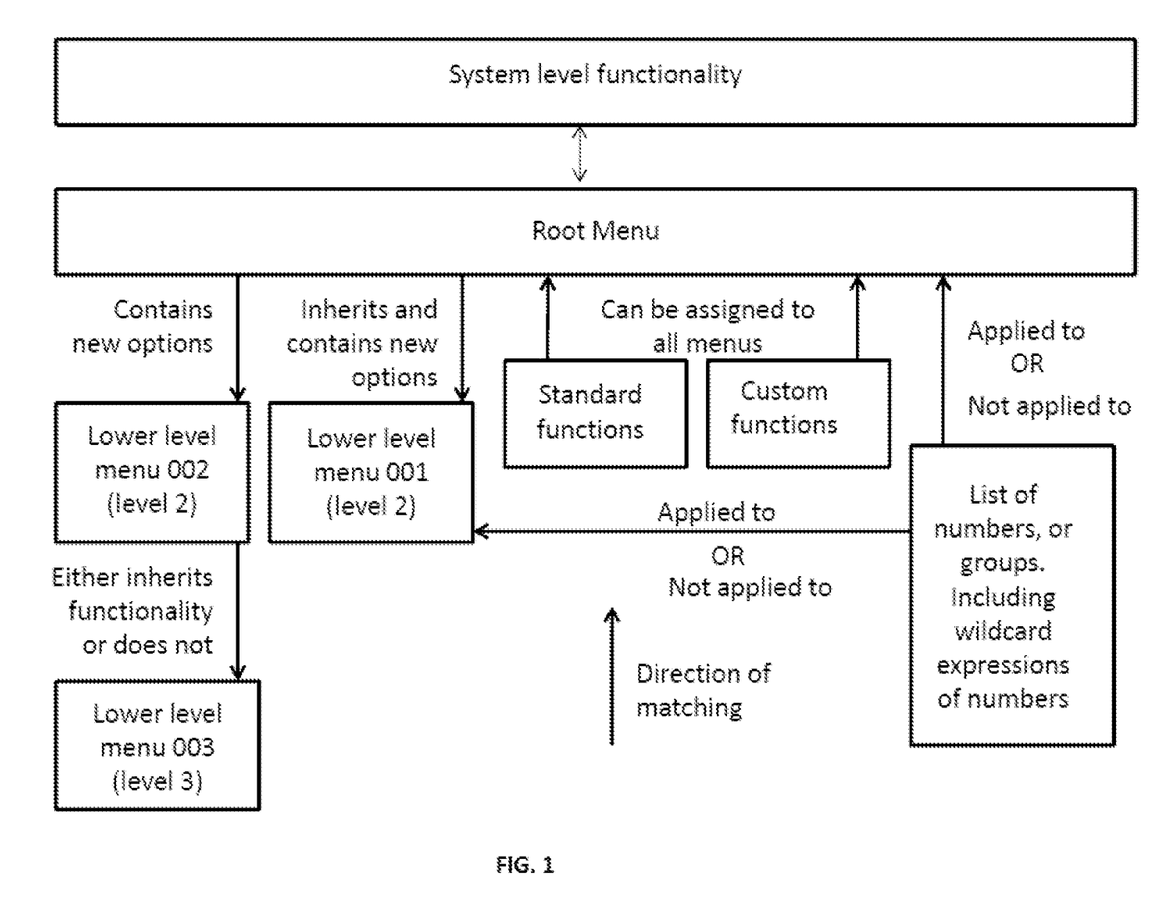
FIG. 1 shows an overall logical structure of the invention, comprising system level functionality, root menu with optional submenus, standard functions, custom functions and list of numbers and groups including wildcard expressions of numbers.
Figure 2:
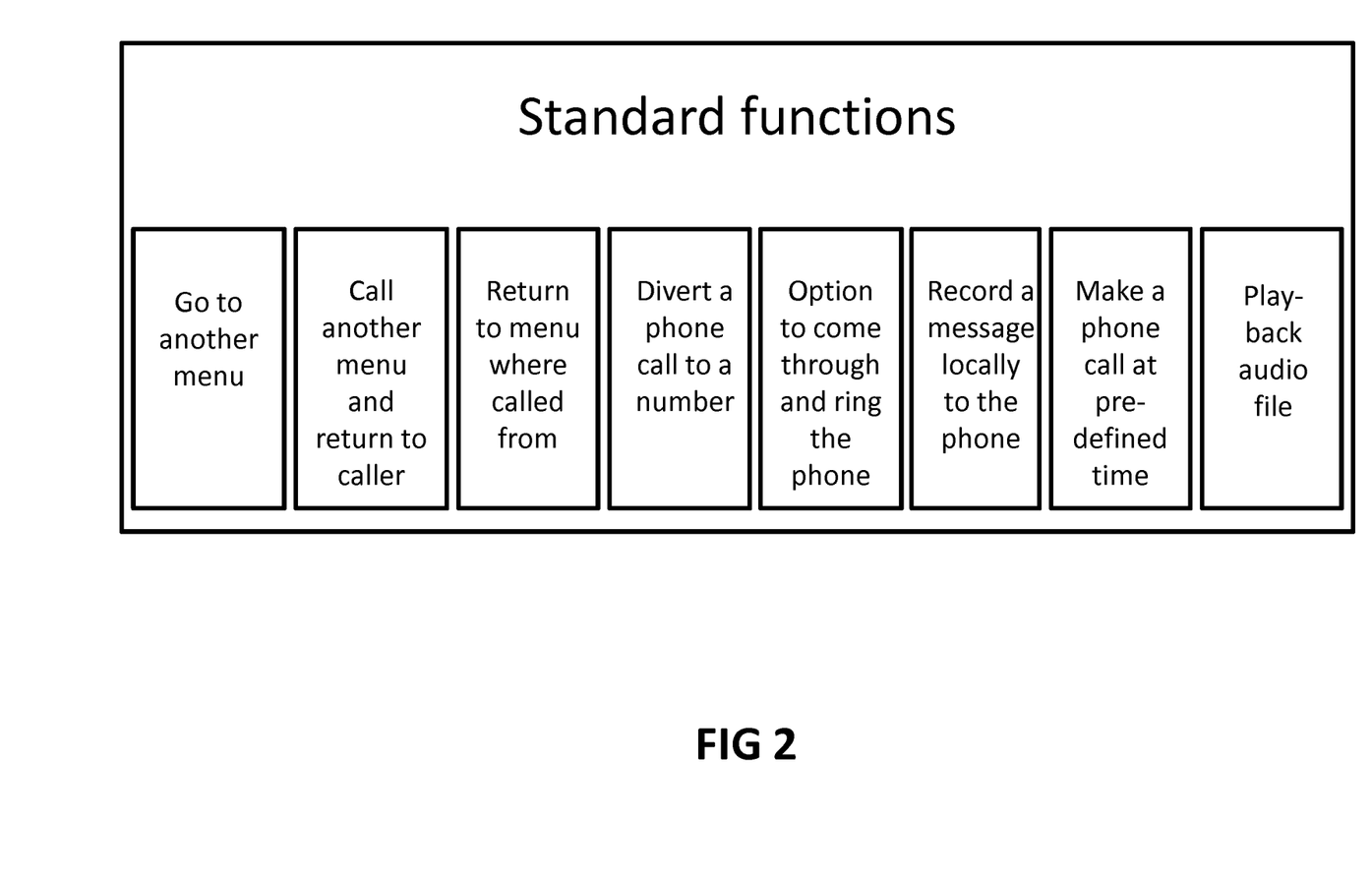
FIG. 2 shows standard functions of the invention in greater detail: comprising "go to another menu", "call another menu and return to caller"; "return to menu where called from"; "divert phone call to a number"; "option to come through and ring the phone"; "record a message locally to the phone", "make a phone call at predefined time", "playback audio file".
Figure 3:
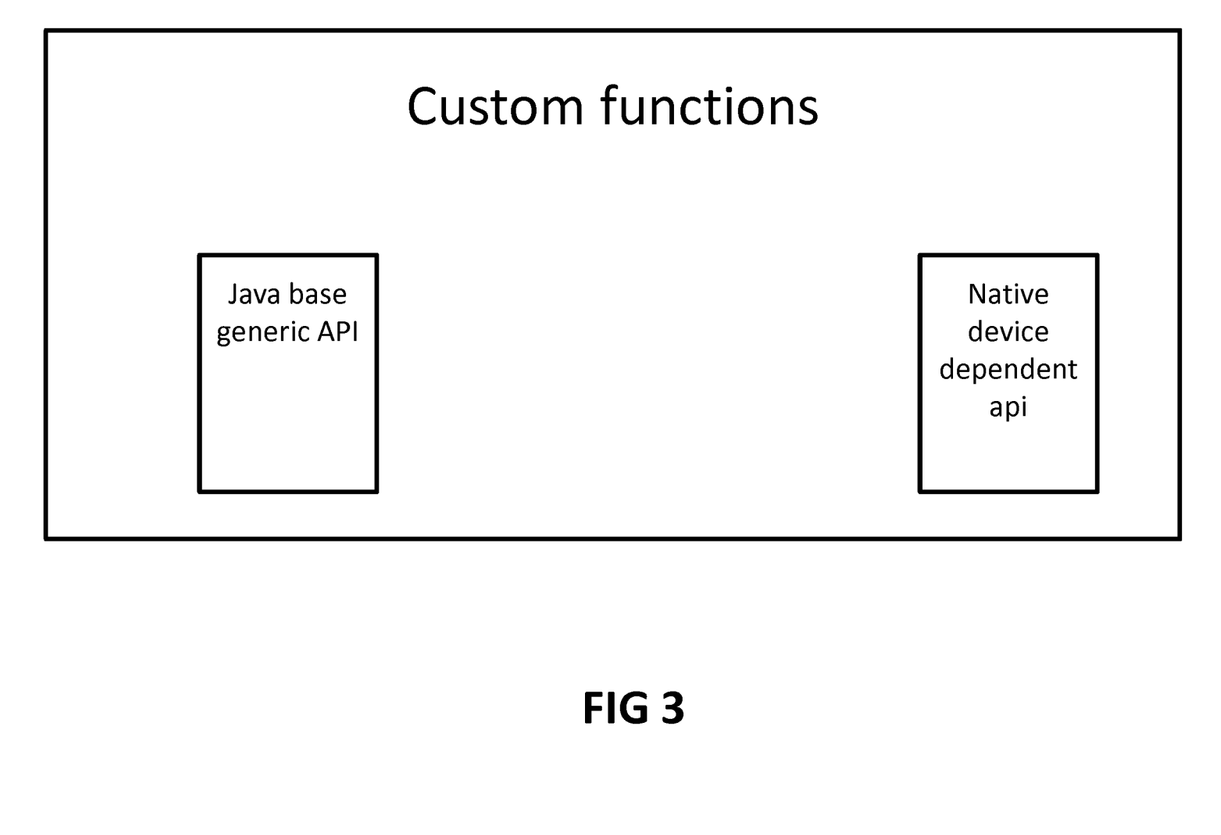
FIG. 3 shows custom functions, including Java based generic API (Application Programming Interface), and a native device dependent API.
Figure 4:
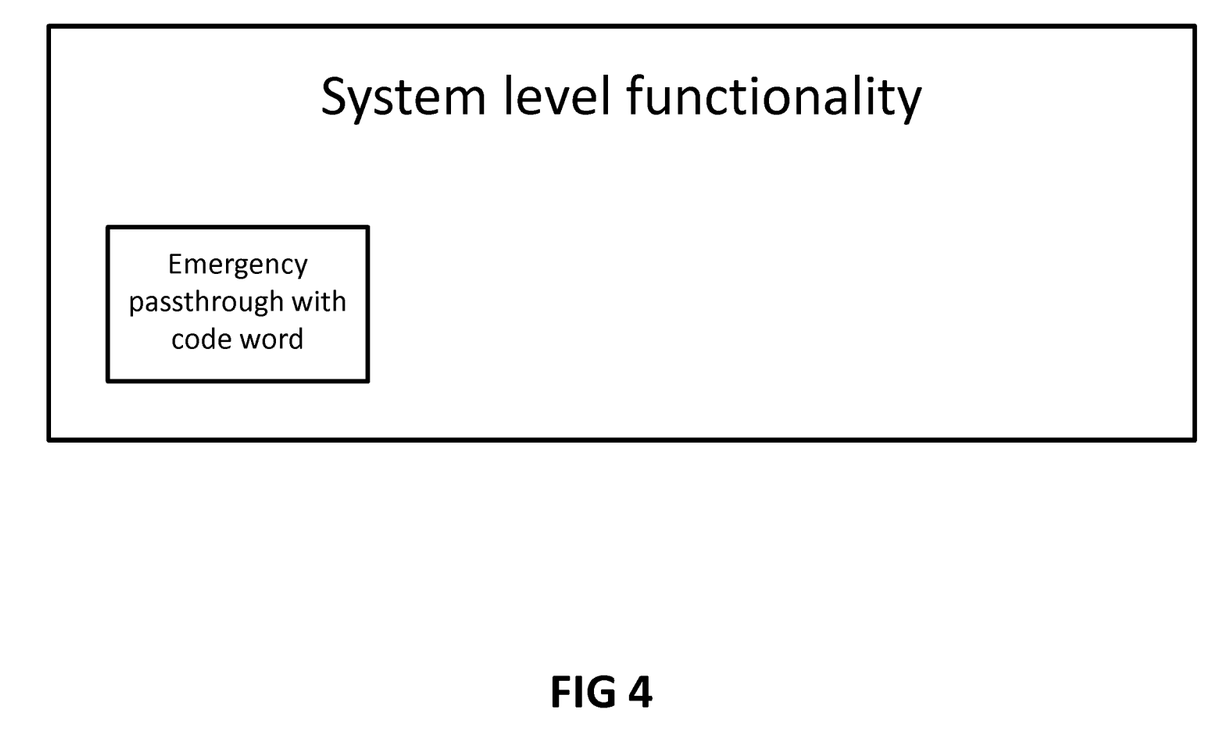
FIG. 4 describes the system level functionality with emergency passthrough with code word.

In the current preferred embodiment the terminal based interactive IVR system is based on a system level functionality which in turn exchanges information with the root menu (FIG. 1). The root menu is firstly capable of verifying the user's number's match against the known list of numbers or groups (including wildcard expressions with numbers, there can also be more than one exact match on a user ID where the correct one will be determined e.g. by user's time zone, geographic location, chosen phone profile etc.). Secondly the root menu interacts with standard functions and custom functions (FIG. 1), while all of them can be assigned to all submenus. The standard functions include functions such as 'go to another menu', 'call another menu and return to caller' etc. Selections of standard functions are depicted in FIG. 2. The custom functions are constructed of e.g. Java based generic API (Application Programming Interface) and native device dependent API (FIG. 4).

The root menu comprises also submenus (level 2, level 3 in FIG. 1). In the current preferred embodiment the root menu comprises two levels of submenus: lower level submenus and their child menus (FIG. 1). The lower level submenus and child menus are assigned to the user(s) during the call for entering requested information through the user's terminal devices keypad. The lower level menus contain options to receive amendments to their structures from the root menu during the call and based on the user assigned information, including the priority level of the transferable message. The main user has the ability to navigate through the action tree assigned to a user also during the session in progress.

The terminal based interactive IVR system of this invention comprises a functionality of at least answering a call, responding to the user, reading keypad readings and also an additional functionality, e.g. while the terminal based interactive IVR system has responded to the user on behalf of the main user, the user can assign a priority level to a message (for example a voice or text message), such that based on the priority information the terminal based interactive IVR system comprises such a decision tree, that the message can be handled by different means and not only classified based on the user's ID value (there can be other criteria defined by the main user taken into consideration when the action tree is used).

As an example of four level of priorities of a message, the terminal based interactive IVR system of this invention can record a voice message from the user in the main user's terminal device's memory in case the fourth (lowest) priority level information is entered by the user. In case the third priority level information is entered by the user, the system will beep shortly the main user's terminal device's sound unit and then record the message to the terminal device's memory after a predefined time. In case the second priority is assigned by the user, the system will ring loudly the sound unit of the main user's terminal device and after some time record the message, and then after predefined time the sound unit of the main user's terminal device is still activated for the main user's attendance. In case of first priority the system would activate the sound unit of the main user's terminal device automatically after defined time and allow the main user to hear the voice message immediately.

In all instances the main user has an ability to amend or navigate the action trees of the terminal based interactive IVR system during a session in progress, so that the final action may be different from the action of what would have occurred according to the predefined action tree.

The remote configuration, storage and synchronization facility in the data communication network (FIG. 6) is mostly used for creating and testing the action trees for the terminal based interactive IVR system and maintaining them and synchronizing them with the main user's terminal device, and also allowing the main user's terminal device to initiate synchronization with the remote configuration, storage and/or synchronization facility.

In the second preferred embodiment the selected user has been given a code word defined by the main user of the terminal based interactive IVR system, where the code word has been assigned (on the system level functionality) (FIG. 4) specific enquiries and actions, and accordingly activating the sound unit of the main user's terminal device immediately and at the same time this code word is not published to user by the same communication means which is used between the user and the terminal based interactive IVR system.

While the user is calling to the main user of the terminal based IVR system and is entering the code word by the keypad, then the sound unit of the main user's terminal is activated and the voice message of the user is played to the main user. The alternative way of realizing the described scenario would be creating a partly or fully hidden action tree.

In yet another preferred embodiment, the main user has the option of inserting information to the action tree of extended data, which is used by the system for selecting the best action tree, above all in case, where one user has been assigned many action trees. In example, the action tree has been added information, where on selected dates and times the selected user has been assigned one action tree and on all other times another action tree.

Figure 5:
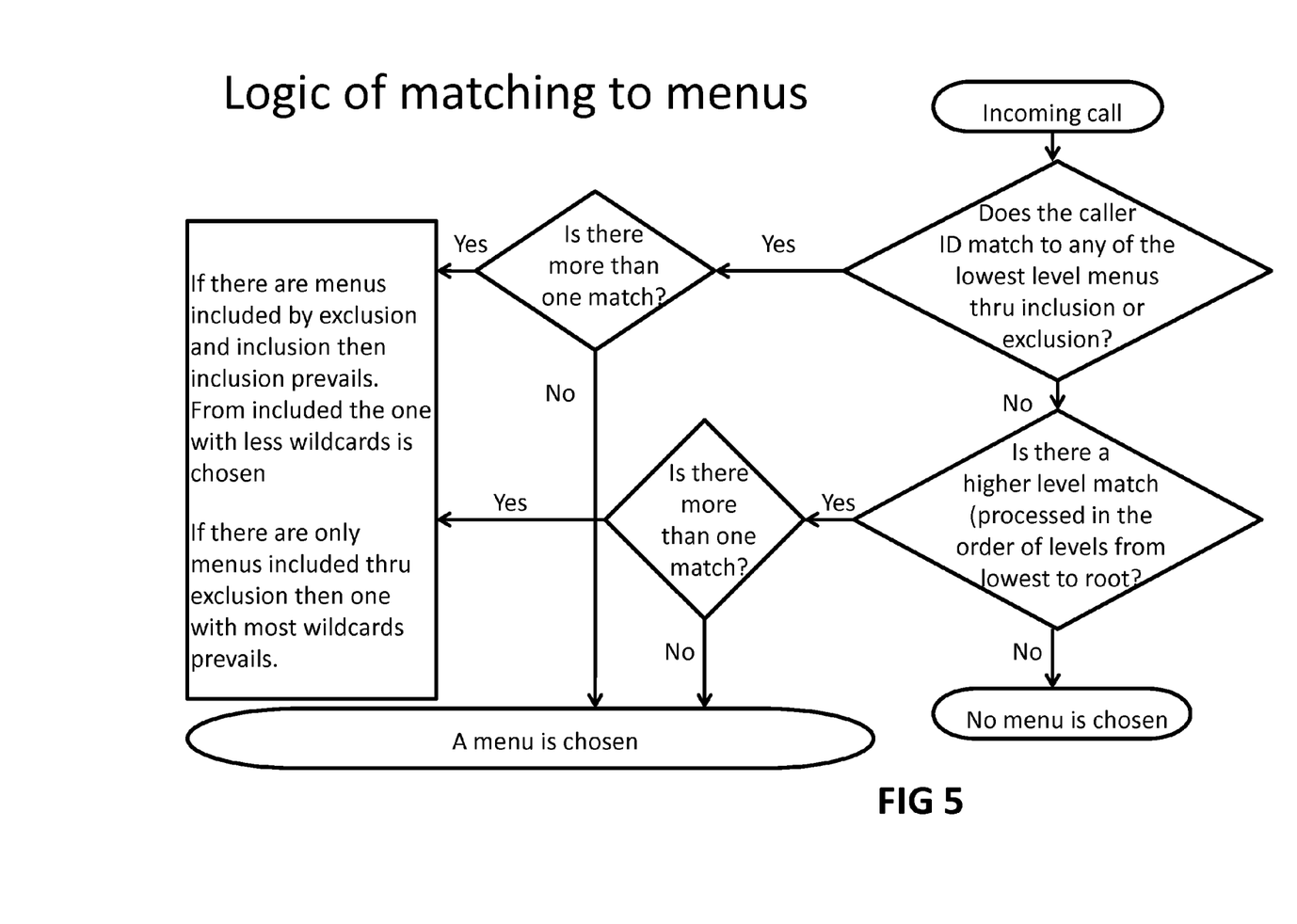
FIG. 5 depicts the generic flowchart about logic of matching to menus. The direction of matching as shown in FIG. 5 is also depicted in FIG. 1 with an arrow.

FIG. 5 depicts the logic of matching menus (shown in FIG. 1): Upon an incoming call to the main user's terminal, the system seeks matches of the caller ID with any lowest level menus of the system though inclusion or exclusion. If no lowest level matches are found the system seeks higher level matches. If no matches are found no menu is chosen. In case one match is found a menu is chosen. If more than one match is found the menus are reviewed by exclusion and inclusion. Inclusion prevails and of the included ones the one with less wildcards is chosen. If all menus only ha exclusions, then the menu with most wildcards prevails.

What is claimed is:

1. A terminal based interactive voice response (IVR) system with information prioritization, said system comprising:

a terminal device of a main user comprising a memory unit, a display unit, an input unit, a sound unit and a communication unit; and one or more terminal devices of one or more users, wherein:
the IVR system is served from and maintained in the terminal device of the main user and adjusted to exchange information with the one or more terminal devices of the one or more users, and wherein inquiries and actions in the system are carried out according to one or more action trees created and stored in the main user's terminal device; and
the IVR system comprises means for allowing the system maintained and served in the terminal device of the main user to interact with the one or more terminal devices of the one or more users and allowing the one or more users to assign different values of priority level to a message before transmission of the message to the main user, thereby individually personalizing an action tree for the one or more users;
wherein the system comprises a remote configuration, storage and synchronization facility on a data communication network; and
wherein the remote configuration, storage and synchronization facility comprises a storage area and a network communication unit, and
wherein the main user's terminal device is adjusted to exchange information with the remote configuration, storage and the synchronization facility, and
the action tree can be created, tested and maintained both through the main user's terminal device and through the remote configuration, storage and synchronization facility.

2. The system of claim 1, wherein at least one user has more than one individualized action trees.

3. The system of claim 2, wherein the action trees(s) or part of them are hidden from the one or more users.

4. The system of claim 2, wherein the one or more users have more than one action trees and the system includes means for the main user to enter additional data to choose which action tree is used.

5. The system according to claim 1, wherein the main user has additional means for generating an activatable user based action tree.

6. The system according to claim 1, wherein the system includes means for the main user to generate a user group and an activatable user group based action tree.

7. The system according to claim 1, wherein the system comprises means to create one or more action trees for each of said users by the main user independently or to create an action tree to several users in a single step.

8. The system according to claim 1, wherein the system further comprises automated means of transporting the action tree information and the query information between the remote configuration, storage and synchronization facility and the main user's terminal device.

9. The system according to claim 1, wherein the system further comprises means for the main user to navigate an action tree before the tree is assigned to the user based on information provided by the user.

10. The system according to claim 1, wherein the system further comprises means to the main user to manually manipulate the action tree assigned to the user, said manipulation being based on information provided by the user during a call in progress.

11. The system according to claim 10, wherein the manual manipulation comprises activation of a default action tree, assigning a new action tree to the user, deleting an action tree, allowing the call through, and locking the call out.

12. The system according to claim 1, wherein the remote configuration, storage and synchronization facility allows creating, modifiying, deleting, synchronizing, storing and restoring the action trees and exchanging user based action trees with the main user's terminal device via the communication unit.

13. The system according to claim 1, wherein the system includes activatable additional customized functions constructed of generic API (Application Programming Interface) and native device dependent API interface.

14. The system according to claim 13, wherein the activatable additional customized functions are constructed of Java based generic API interface.

* * * * *